(12) United States Patent
Thiel

(10) Patent No.: US 8,454,092 B2
(45) Date of Patent: Jun. 4, 2013

(54) LOCKING DEVICE, IN PARTICULAR FOR A VEHICLE SEAT

(75) Inventor: Peter Thiel, Remscheid (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 534 days.

(21) Appl. No.: 12/674,054

(22) PCT Filed: Jan. 14, 2009

(86) PCT No.: PCT/EP2009/000160
§ 371 (c)(1),
(2), (4) Date: Feb. 18, 2010

(87) PCT Pub. No.: WO2009/097948
PCT Pub. Date: Aug. 13, 2009

(65) Prior Publication Data
US 2011/0127814 A1 Jun. 2, 2011

(30) Foreign Application Priority Data
Feb. 8, 2008 (DE) .................. 10 2008 008 936

(51) Int. Cl.
*B60N 2/433* (2006.01)
(52) U.S. Cl.
USPC ................. 297/378.11; 297/378.12
(58) Field of Classification Search
USPC ............... 297/378.1, 378.11, 378.12
See application file for complete search history.

(56) References Cited

U.S. PATENT DOCUMENTS

| 5,540,117 | A | 7/1996 | Haensel et al. | |
| 5,634,689 | A | 6/1997 | Putsch et al. | |
| 6,598,938 | B2 * | 7/2003 | Boltze et al. | 297/378.11 |
| 6,742,845 | B2 * | 6/2004 | Nock | 297/378.11 |
| 6,799,806 | B2 | 10/2004 | Eppert et al. | |
| 6,840,579 | B2 * | 1/2005 | Klein et al. | 297/378.12 |
| 6,910,739 | B2 * | 6/2005 | Grable et al. | 297/378.1 |
| 7,287,814 | B2 * | 10/2007 | Heimann et al. | 297/378.11 |

FOREIGN PATENT DOCUMENTS

| DE | 4436101 A1 | 6/1995 |
| DE | 4439644 A1 | 6/1995 |
| DE | 10105282 B4 | 3/2005 |
| DE | 202005012733 | 2/2007 |
| DE | 102006004489 | 8/2007 |
| EP | 0 872 375 | 10/1998 |
| EP | 1 291 236 | 3/2003 |
| WO | WO 2007/087876 | 8/2007 |

\* cited by examiner

*Primary Examiner* — Anthony D Barfield
(74) *Attorney, Agent, or Firm* — McGlew and Tuttle, P.C.

(57) ABSTRACT

A locking device, in particular for a vehicle seat, includes a latch (24) and a counter element that interacts for locking. A bearing bush (30), a release element (32) that is rotationally mounted inside the bearing bush (30) and a catch element (34) for reinforcing the latch (24) in the event of a crash are provided with the catch element (34) being mounted in a rotationally secure manner on the release element (32) or being embodied as one piece with the release element. A tightening element (36), for securing the locked latch (24) during normal operation, is arranged in an axial manner adjacent to said catch element (34) and is mounted in a pivotable manner and is prestressed in such a manner that it is pivotably mounted on the outside on the bearing bush (30).

20 Claims, 7 Drawing Sheets

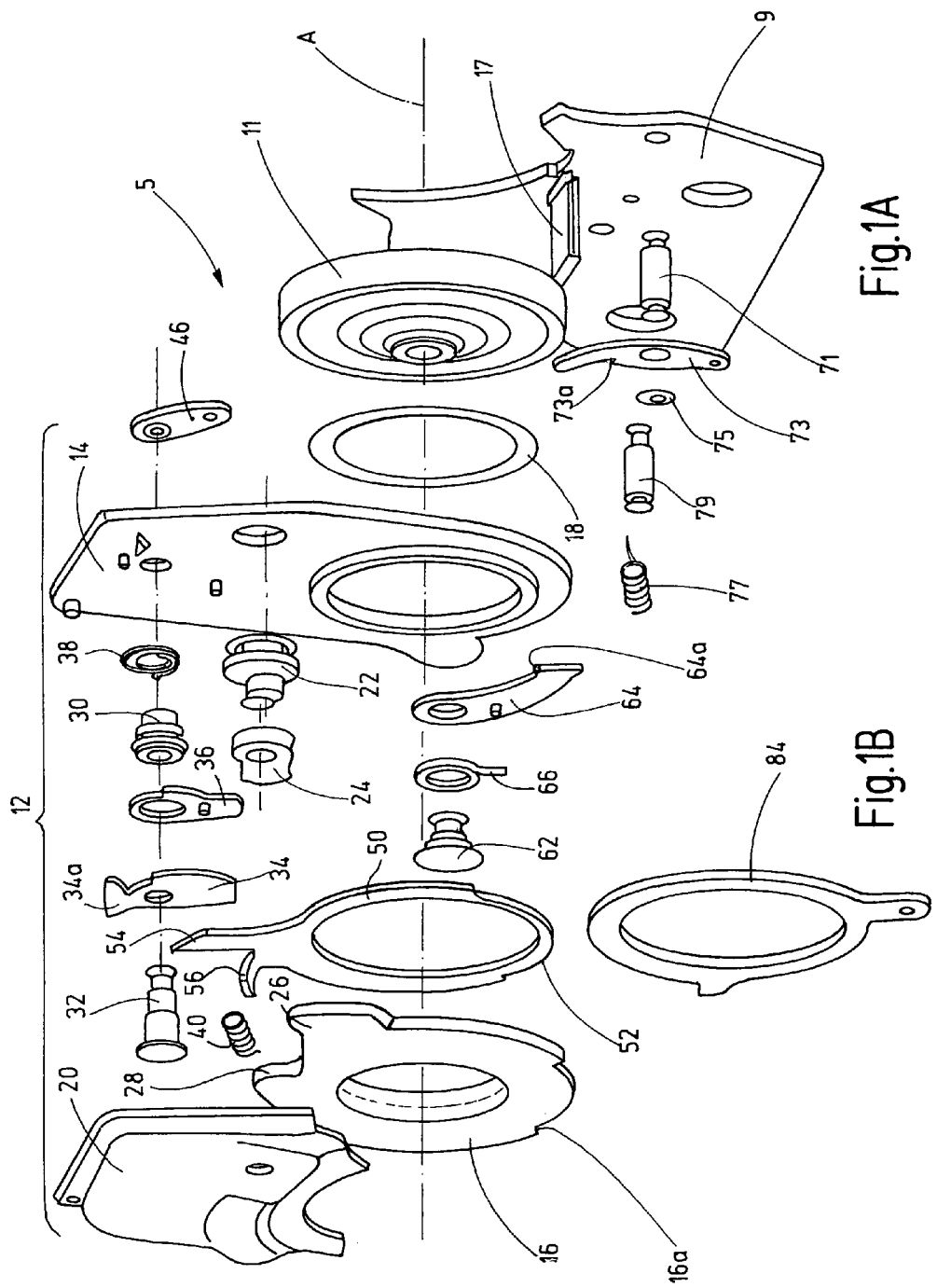

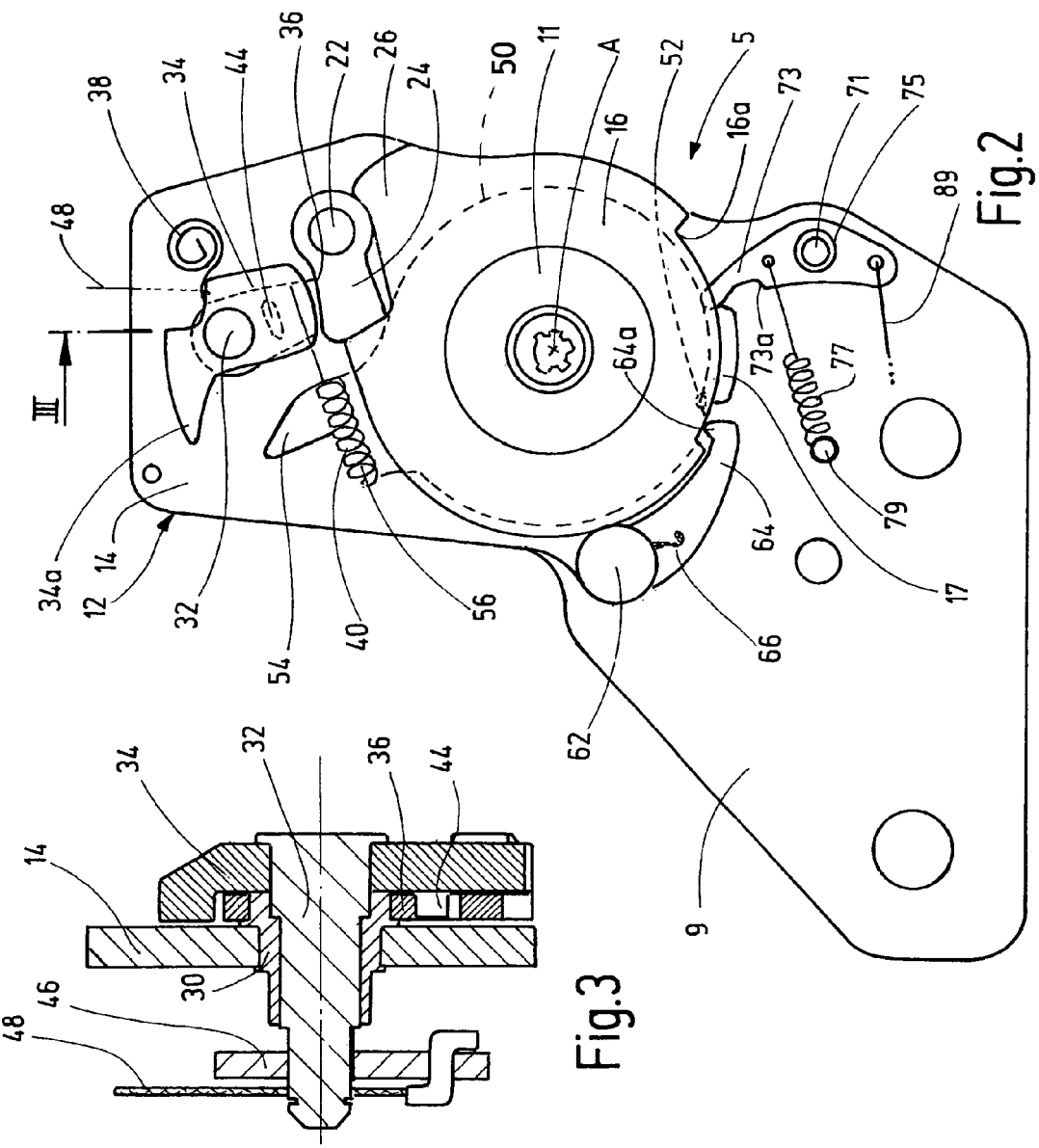
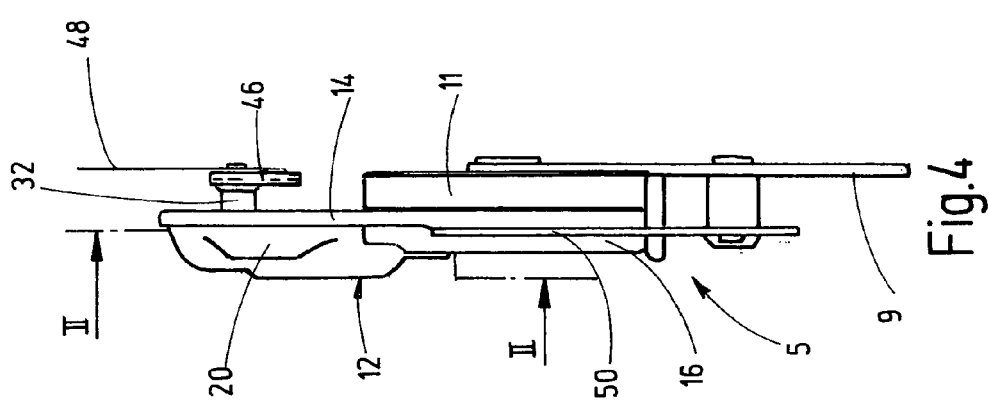

LOCKING DEVICE, IN PARTICULAR FOR A VEHICLE SEAT

CROSS REFERENCE TO RELATED APPLICATIONS

This application is a U.S. States National Phase application of International Application PCT/EP2009/000160 and claims the benefit of priority under 35 U.S.C. §119 of German Patent Application DE 10 2008 008 936.2 filed Feb. 8, 2008, the entire contents of which are incorporated herein by reference.

FIELD OF THE INVENTION

The invention relates to a locking device, in particular for a vehicle seat, comprising a latch and a counter element, which interact for locking.

BACKGROUND OF THE INVENTION

A fitting comprising a locking device of this type for a two-door motor vehicle is known from DE 10 2006 044 489 A1, which is used to permit access to the rear by means of the backrest freely pivoting in the forward direction, and to provide different inclination adjustments of the backrest for use by a passenger. For the free pivoting, the locking device is unlocked by a release element being rotated. In order to prevent undesired pivoting-back of the backrest, for example when the cushioning in the transition region between the backrest and the seat part is too great, a securing of the backrest is provided in the freely pivoted position.

SUMMARY OF THE INVENTION

The object of the invention is to improve a locking device of the aforementioned type.

According to the invention, a locking device is provided with a latch, a prestressed clamping element for securing the locked latch normally and a catch element for reinforcing the latch in the event of a crash. For unlocking the latch, a release element is provided, the rotation thereof about its own axis preferably pivoting the catch element away from the latch. The clamping element is preferably coupled so that it may be carried along with free travel, for example by means of a slotted pin guide, so that it is ultimately also pivoted away from the latch by the rotating release element, thus unlocking said latch. A bearing bush is provided for mounting the release element and the clamping element. The mounting of the release element according to the invention inside the bearing bush and the clamping element on the outside on the bearing bush has the advantage that, at the start of the rotation of the release element, the clamping element is not already inadvertently carried along, for example due to friction but, for example, only when the free travel has been passed. Moreover, if the clamping element were to be pivoted away in the event of a crash, the catch element would be able to remain unaffected in its position.

The locking device is preferably a component of a fitting for a vehicle seat having a seat part and a backrest, the fitting preferably being provided with an adjustment fitting for the inclination adjustment of the backrest relative to the seat part, a freely-pivoting unit for the centric free-pivoting of the backrest from at least one position of use into a freely pivoted position, which is triggered by means of a freely-pivoting operating element, a fitting lower part which may be connected to the seat part and which carries the adjustment fitting and a fitting upper part associated with the freely-pivoting unit, which may be connected to the backrest and which in the position of use is locked by means of the locking device.

The latch is preferably pivotably articulated to the fitting upper part and locked to a detent plate of the freely-pivoting unit. Preferably, a cover is provided which is connected to the fitting upper part and covers the locking device. The adjustment fitting is connected with its two fitting parts which are rotatable relative to one another, on the one hand, preferably fixedly to the detent plate and, on the other hand, fixedly to the fitting lower part. Thus the freely-pivoting unit may be produced and tested as a pre-assembled sub-assembly.

Preferably, a securing latch is provided which secures the fitting upper part in the freely-pivoted position of the backrest to the fitting lower part. The securing latch is preferably able to be opened automatically by means of the longitudinal adjuster of the vehicle seat, in particular when the longitudinal adjuster moves the vehicle seat into the previously set longitudinal seat position, which is recognized by a memory device. Moreover, the securing latch may be opened manually by means of the freely-pivoting operating element, in particular in specific situations when, for example, the previously set longitudinal seat position is no longer reached. A freely-pivoted position, independent of the set inclination of the backrest, results when securing the fitting upper part to the fitting lower part.

The securing latch is preferably pivotably articulated to the fitting upper part and cooperates, for the purpose of securing, with a stop on the fitting lower part. This simplifies the coupling to the longitudinal adjuster. The stop preferably also defines the inclination adjustment, for example by it being arranged within a recess of the detent plate. The dual function dispenses with a further component. The securing latch in the position of use preferably bears against a component of the freely-pivoting unit, for example the detent element or a switching ring, which is advantageous for the freely-pivoting unit as a pre-assembled sub-assembly. During the free pivoting of the backrest, when reaching the stop the securing latch may pivot slightly upwards with the further pivoting movement of the backrest and slide along the underside of the stop, until it engages behind the stop after passing the stop. However, other possibilities for the cooperation of the securing latch and the stop are also possible. The securing latch and the stop preferably cooperate outside the self-locking region. A pretensioning may ensure a non-positive cooperation. Thus it is respectively ensured that the securing latch opens by a relative movement of the fitting upper part and stop and/or above a marginal force.

The securing latch is preferably secured by an operating lever, which is preferably prestressed. The securing may take place positively or non-positively. The securing latch secured by the operating lever may be opened, by the cooperation of the securing latch and the operating lever being canceled, for example by the operating lever being pivoted away from the securing latch. This may take place automatically in the presence of specific conditions, for example in a specific longitudinal seat position, so that the backrest may then be pivoted back into its initial position.

By means of a rotatable switching ring which during the actuation of the freely-pivoting operating element, cancels the cooperation of the securing latch and the operating lever, the securing operation may be manually terminated. The rotation of the switching ring is, for example, effected by the catch element, for which said two components preferably have projections with suitably higher sides. The rotated switching ring preferably acts by means of a switching contour on the operating lever, in order to remove said operating lever from the securing latch.

The invention may be used preferably in longitudinally adjustable vehicle seats of two-door motor vehicles with central free pivoting of the backrest, but also may be used for other vehicle seats. With a use of the fitting according to the invention for activating the so-called "easy entry function", in which apart from a free pivoting of the backrest a movement of the vehicle seat takes place, the backrest may be pivoted back exactly when the previously set longitudinal seat position is reached.

The invention is described in more detail hereinafter with reference to an embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1A is an exploded view showing an embodiment according to the invention without control cables;

FIG. 1B is a perspective view of an unlocking ring;

FIG. 2 is a sectional view through the embodiment along the line II-II in FIG. 4, in a position of use in a locked state;

FIG. 3 is a sectional view through the upper part of the embodiment along the line III-III in FIG. 4;

FIG. 4 is a lateral view of the embodiment;

DESCRIPTION OF THE PREFERRED EMBODIMENT

Figure 5:
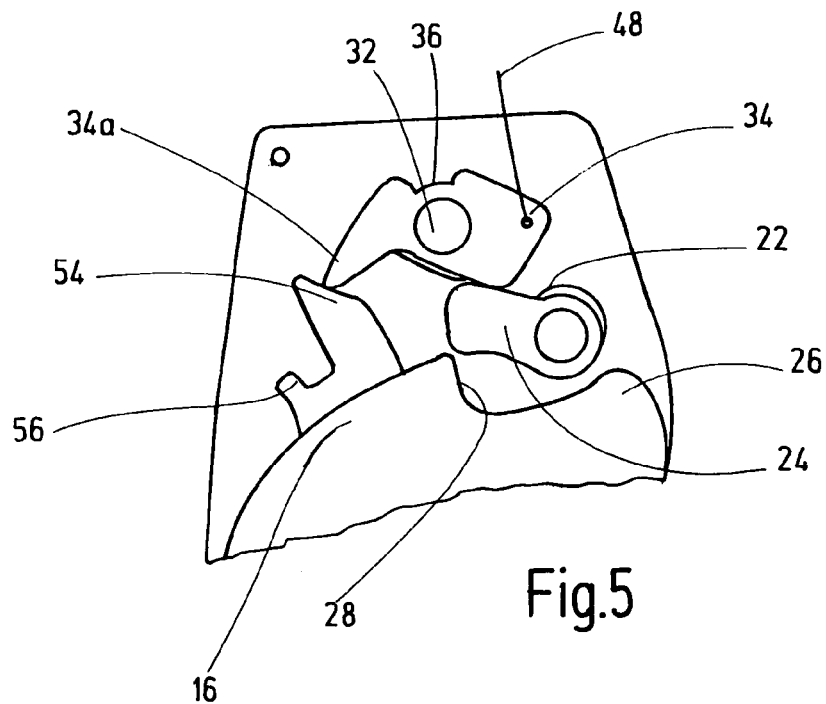
FIG. 5 is a partial sectional view through the embodiment during unlocking, for free pivoting of the backrest.
Figure 6:
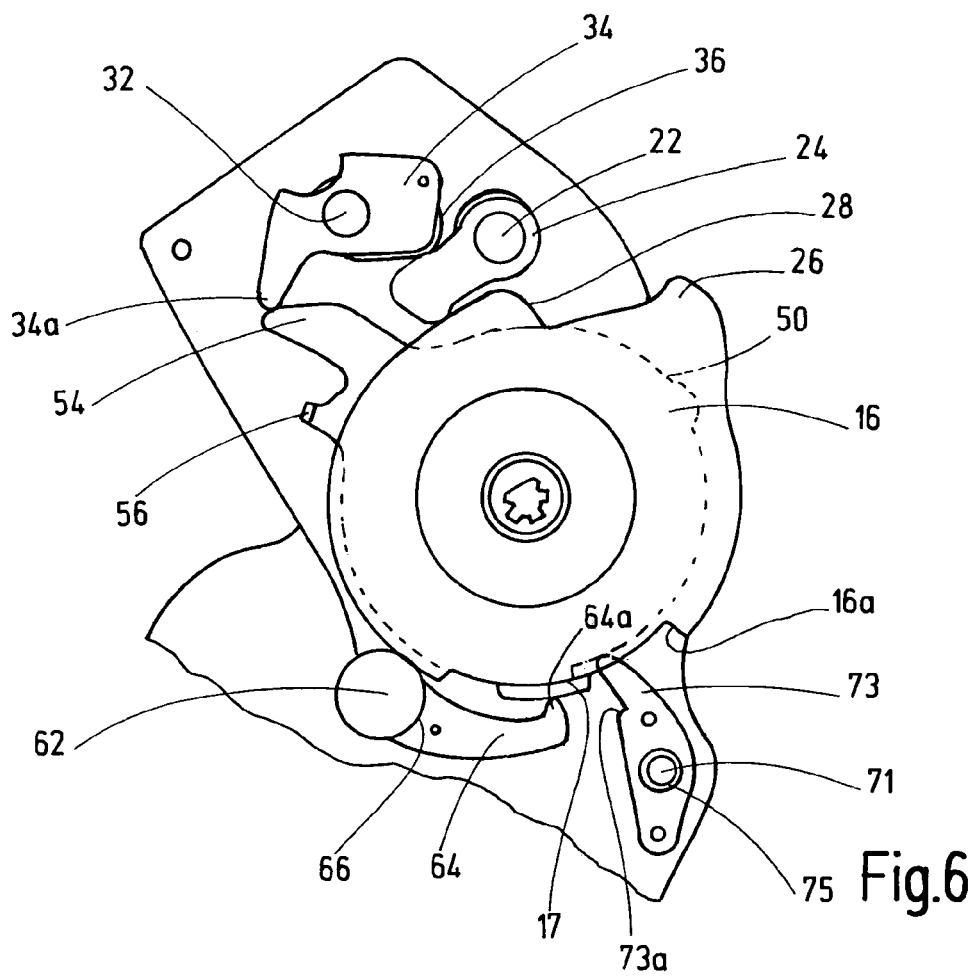
FIG. 6 is a partial sectional view through the embodiment during the free pivoting of the backrest.
Figure 7:
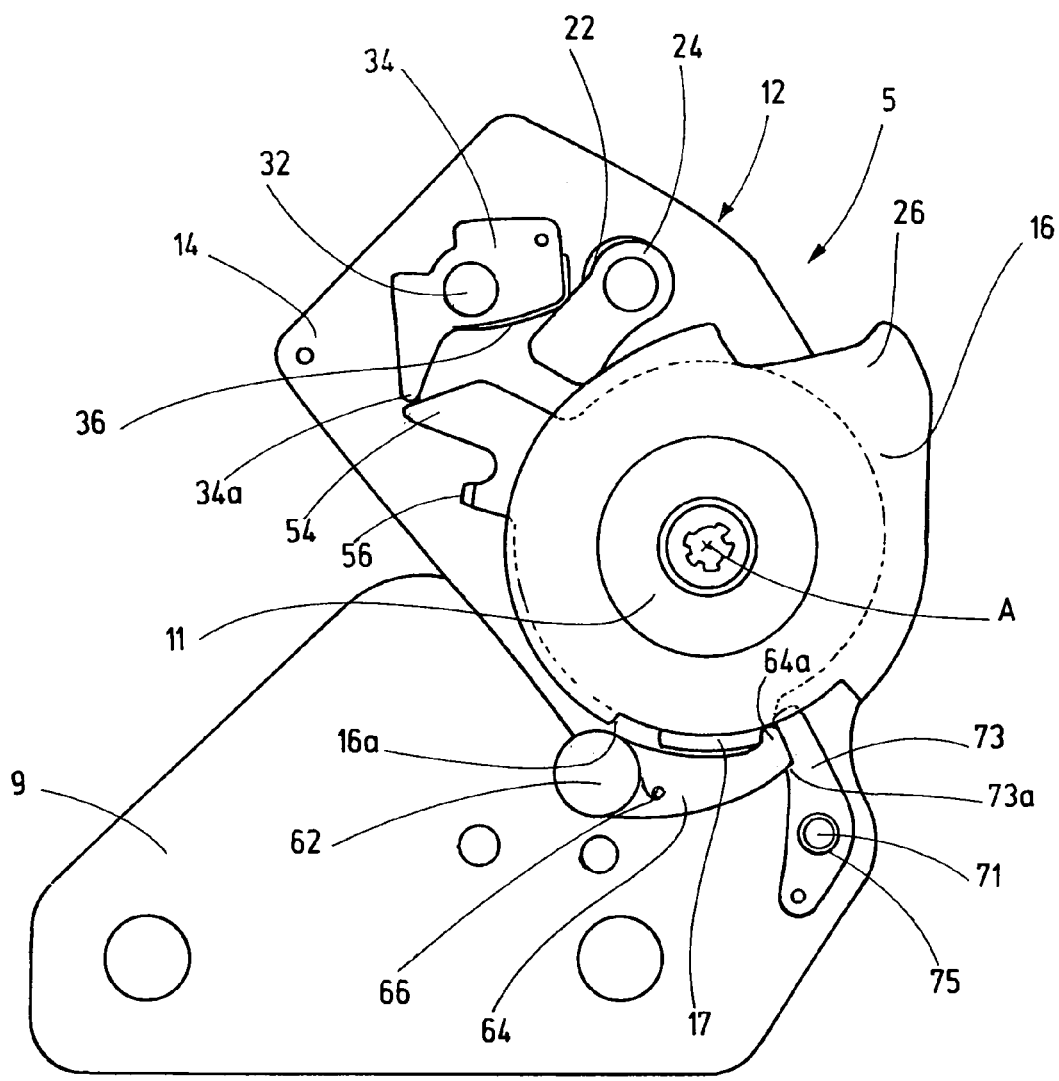
FIG. 7 is a sectional view through the embodiment according to FIG. 2 in a secured state in the freely pivoted position of the backrest.
Figure 10:
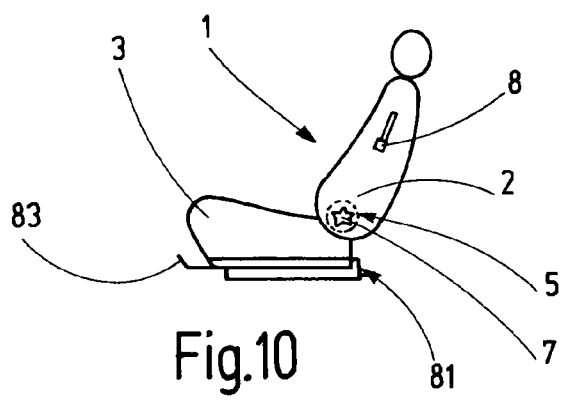
FIG. 10 is a schematic side view of a vehicle seat.
Figure 8:
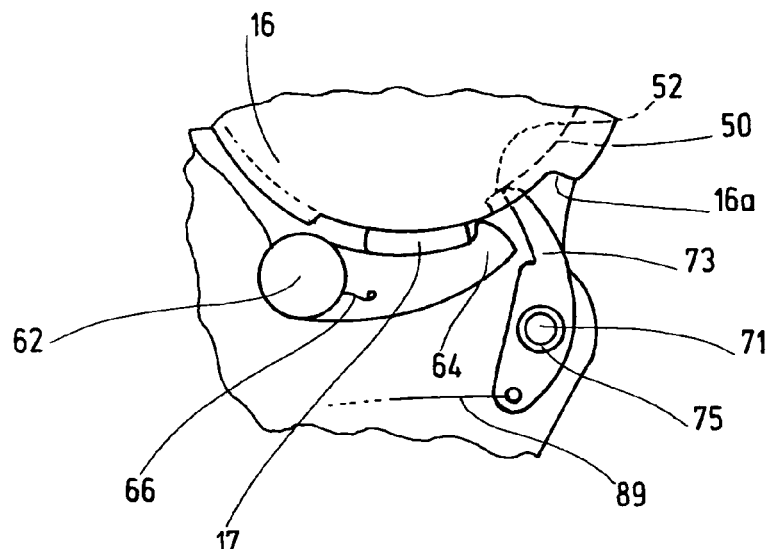
FIG. 8 is a partial sectional view through the embodiment when automatically opening the securing by means of the longitudinal adjuster.
Figure 9:
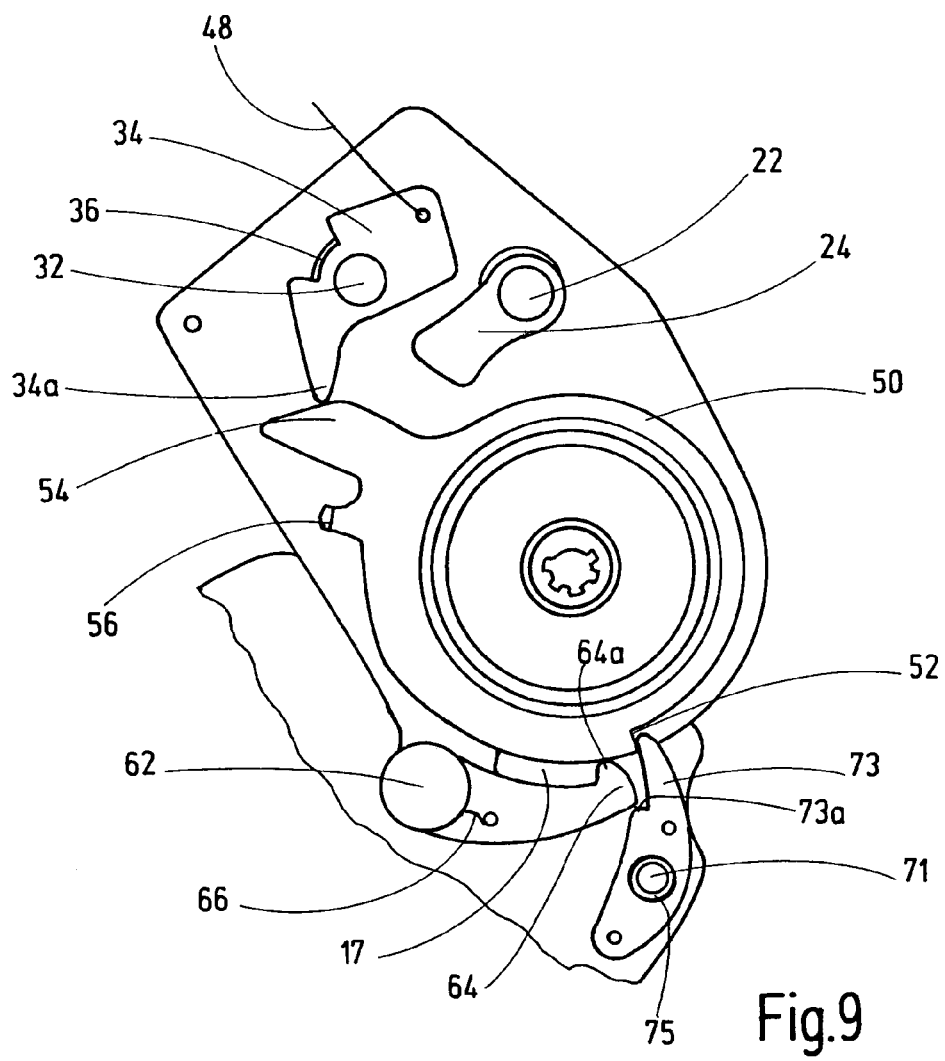
FIG. 9 is a partial sectional view through the embodiment when manually opening the securing by means of the freely-pivoting operating element, the detent plate not being shown.

Referring to the drawings in particular, a vehicle seat 1 for a two-door motor vehicle has, for the inclination adjustment, i.e. the slow, small angular alteration between a plurality of positions of use, and free pivoting, i.e. the rapid, large angular alteration from a position of use into a freely pivoted position as a specific position of non-use, of its backrest 2 relative to its seat part 3, one respective fitting 5 on both of its sides. On the outside of the vehicle seat 1, for the inclination adjustment function on one of the fittings 5, a handwheel 7 is provided and between both fittings 5 a shaft connected to the handwheel 7, whilst for the free-pivoting function a freely-pivoting operating element 8, for example a hand lever, is movably attached to the backrest 2.

Each fitting 5 comprises a fitting lower part 9 which serves for fastening the fitting 5 to the structure of the seat part 3 ("fixed to the seat part"), a backrest inclination adjustment fitting, denoted in short hereinafter as an adjustment fitting 11, and a freely-pivoting unit 12 which in turn has a fitting upper part 14, which is used for fastening the fitting 5 to the structure of the backrest 2 ("fixed to the backrest").

The adjustment fitting 11 is formed in terms of structure as a disc-shaped unit, as is disclosed for example in DE 101 05 282 B4 (corresponding to U.S. Pat. No. 6,799,806), the disclosure thereof being expressly included in the invention. The adjustment fitting 11 has two fitting parts which may be rotated relative to one another and are held together by means of a clamping ring in the axial direction. In the embodiment, the adjustment fitting 11 is configured as a geared fitting, i.e. the two fitting parts of the adjustment fitting 11 are connected to one another in transmission by means of an eccentric epicyclic gear—which is self-locking here—and which in the present case permits a securing without clearance of the two fitting parts of the adjustment fitting 11, and for the stepless adjustment forces a relative rotation of the two fitting parts of the adjustment fitting 11 with a superimposed wobble motion. The path of this wobble motion might be denoted as a wobble loop. Such a geared fitting is, for example, disclosed in DE 44 36 101 A1 (corresponding to U.S. Pat. No. 5,634,689), the disclosure thereof being expressly included in the invention. The rotation of the handwheel 7 drives the geared fitting. However, other geared fittings and—in theory—also detent fittings may also be used as adjustment fittings 11. In the latter case, a small rotation of the handwheel 7 or a lever provided as an alternative unlocks the detent fitting. The adjustment fitting 11 is connected by one of its two fitting parts and the clamping ring fixedly to the fitting lower part 9, i.e. one of the two fitting parts of the adjustment fitting 11 is fixed to the seat part. To this end, the fitting lower part 9 has a fork-shaped receiver for the adjustment fitting 11.

The freely-pivoting unit 12 has an—approximately annular—detent plate 16, relative to which the fitting upper part 14 is rotatably mounted about an axis A. The axis A and its position within the vehicle seat 1 define the directional information used in the present case. As the axis A—possibly apart from the wobble motion—coincides with the central axis of the adjustment fitting 11, in the present case central free pivoting is present. A stop 17 is fastened to the fitting lower part 9 and projects therefrom axially. The detent plate 16 has on one part of its periphery a recess 16a offset radially to the inside, defined in each case by a step, within which the stop 17 is arranged. By the cooperation of the stop 17 with the steps of the detent plate 16, the angle for the inclination adjustment of the backrest 2 is defined. The detent plate 16 (and thus the freely-pivoting unit 12) is fixedly connected to that of the two fitting parts of the adjustment fitting 11 which is not fixed to the seat part. The connection of the freely-pivoting unit 12 to the adjustment fitting 11 takes place, for example, by laser welding.

For the mounting of the fitting upper part 14, the detent plate 16 in the present case has a collar projecting axially relative to the axis A, on which the fitting upper part 14 is rotatably mounted. The fitting upper part 14 also has a collar which projects towards the detent plate 16, so that between the detent plate 16 and the fitting upper part 14 a constructional space is present. A retaining disk 18 serves as axial securing of the fitting upper part 14. The retaining disk 18 configured as an annular disk is connected to the detent plate 16 after positioning the fitting upper part 14 on the collar of the detent plate 16, said retaining disk engaging behind the fitting upper part 14. A cover 20 connected to the fitting upper part 14, defines, on the one hand, a constructional space between itself and the fitting upper part 14 projecting upwards over the detent plate 16. On the other hand, the lower edge of the cover 20 is configured as a retaining clamp, and engages over the detent plate 16, possibly by the interposition of a slider, for example made of plastics. The cover 20 is thus used as further axial securing of the fitting upper part 14.

On the fitting upper part 14 by means of a bearing pin 22 a latch 24 is pivotably mounted, which may be locked to the detent plate 16. The bearing pin 22 parallel to the axis A defines at the same time the pivoting motion of the fitting upper part 14 to the rear, and namely both normally and also in the event of a (rear) crash, by bearing against a first detent stop 26 of the detent plate 16. For locking the latch 24 and for limiting the pivoting motion of the fitting upper part 14 to the front in the event of a (front) crash, a second detent stop 28 is provided in the radial extension of the latch 24 on the detent element 16. The latch 24 is locked to the detent plate 16, on the one hand, by being supported by means of the bearing pin 22 on the first detent stop 26 and, on the other hand, by bearing with its free end on the second detent stop 28 without clearance. To this end, the bearing takes place at an angle outside the self-locking region. An alternative support on the first detent stop 26 may be implemented by means of a shaping or the like of the fitting upper part 14. Both detent stops 26 and 28 are formed in the present case on the detent plate 16, i.e. configured integrally therewith. The bearing pin 22 is configured as an eccentric pin, i.e. it is rotatably mounted in the fitting upper part 14 about an axis which is offset relative to the pivot axis of the latch 24, relative to said fitting upper part. For compensating for production tolerances, the bearing pin 22 is adjusted and fixed such that the latch 24 bears with maximum latch engagement on the second detent fitting 28.

In the fitting upper part 14 a bearing bush 30 is preferably located fixedly in terms of rotation which, for example, is riveted or welded into an opening of the fitting upper part 14. A release element 32 is rotatably mounted by means of this bearing bush 30, parallel to the axis A and to the bearing pin 22. On the release element 32 is located fixedly in terms of rotation or configured in one piece with the release element 32, a catch element 34, whilst a clamping element 36—arranged axially adjacent to the catch element 34—is mounted pivotably on the bearing bush 30. Thus the release element 32 is mounted inside the bearing bush 30 and the clamping element 36 externally on the bearing bush 30. The catch element 34 and the clamping element 36 are aligned with the latch 24 when the fitting upper part 14 is locked. The mode of operation of the catch element 34 and the clamping element 36 is disclosed in DE 44 39 644 A1 (corresponding to U.S. Pat. No. 4,223,947), the disclosure thereof being expressly included. The clamping element 36 bears with a clamping surface curved eccentrically relative to the release element 32 at an angle outside the self-locking region on a bearing surface of the latch 24. The clamping element 36 is acted upon by a tension spring 38 formed as a helical spring, so that the clamping element 36 bears with pretensioning against the latch 24. As a result, the fitting upper part 14 is locked without clearance to the detent plate 16. The catch element 34 is acted upon by an arresting spring 40 configured as a helical-tension spring. The catch element 34 and the clamping element 36 are coupled to one another to be carried along with free travel by means of a slotted pin guide 44. To this end, the clamping element 36 has a slot curved about the release element 32, into which a pin of the catch element 34 engages. The cover 20 covers the latch 24, the catch element 34, the clamping element 36 and the springs 38 and 40 and protects said elements from soiling.

In the positions of use normally, i.e. in normal use of the seat, the latch 24 is held (secured) by the clamping element 36 in its position and the catch element 34 is arranged at a short distance (relative to the dimensions of the latch 24) from the latch 24, preferably bearing against a stop of the fitting upper part 14. In the event of a crash, if crash forces act on the latch 24, which for example exert a high torque on the fitting upper part 14, the clamping element 36 may open due to the absence of self-locking. After a very slight pivoting motion of the latch 24, said latch bears against the catch element 34. The catch element 34 supports, therefore, the latch 24, which bears within the self-locking region on the catch element 34, preferably tangentially or concentrically and as flat as possible. Thus, the latch 24 is prevented from opening. Thus, the above-disclosed locking device (consisting of the latch 24, the detent plate 16 as a counter element and the catch element 34 and the clamping element 36 as securing elements) locks the fitting upper part 14 (and thus the freely-pivoting unit 12) both normally and in the event of a crash.

On the side of the fitting upper part 14 remote from the cover 20, an unlocking lever 46 is connected fixedly in terms of rotation to the release element 32, to which a first control cable 48, in operative connection with the freely-pivoting operating element 8, is fastened. Alternatively, the release element 32 may also be actuated via an electrical actuator, for example a servomotor or the like. For unlocking the fitting upper part 14 by means of the freely-pivoting operating element 8, by means of the first control cable 48 (and the unlocking lever 46) the release element 32 is rotated about its own axis. The release element 32 drives the catch element 34 connected fixedly in terms of rotation therewith, which drives and thus opens the clamping element 36, by means of the slotted pin guide 44—after passing the free travel—i.e. the clamping element 36 is separated from the latch 24 and moved away. The latch 24 is, as a result, released and may open automatically due to the absence of self-locking. In a modified embodiment, the catch element 34 may bear against an unlocking finger of the latch 24 and pull said latch with the further pivoting motion.

In the present embodiment, the two fittings 5 are configured slightly differently on the two vehicle seat sides. The freely-pivoting unit 12 of the fitting 5 of the one vehicle seat side is also described further hereinafter.

In said fitting 5, on the fitting upper part 14, in particular on the collar thereof (or other projection) (or possibly on the detent plate 16) a switching ring 50 is rotatably mounted concentrically to the axis A. The switching ring 50 is arranged in the axial direction between the detent plate 16 and the fitting upper part 14 (i.e. within the above-mentioned constructional space). The switching ring 50 has a switching contour 52, in the present case a radially projecting step, which is arranged in the lower region of the fitting upper part 14. The switching ring 50 further comprises a radially projecting switching finger 54 and a spring mounting 56, also radially projecting, which are both arranged in the upper region of the fitting upper part 14. The other end of the arresting spring 40 is suspended on the spring mounting 56. The switching finger 54 is located in the pivoting region of the catch element 34 which preferably has a radially projecting actuating arm 34a for cooperating with the switching finger 54. On the fitting upper part 14, a securing latch 64 is pivotably mounted by means of a securing pin 62. The securing latch 64 is prestressed by means of a securing spring 66 against the switching ring 50 and bears with its free end within the recess 16a on the switching ring 50 or on the stop 17. The last-mentioned possibility for bearing is available depending on the inclination of the backrest 2 set by the adjustment fitting 11 and possibly the wobble motion between the fitting parts of the adjustment fitting 11.

On the fitting lower part 9 provided on this vehicle seat side, an operating lever 73 is pivotably mounted in the vicinity of the stop 17 by means of a switching pin 71 parallel to the axis A. A locking washer 75 secures the operating lever 73 on the switching pin 71. A switching spring 77 configured as a helical-tension spring is, on the one hand, suspended on the operating lever 73 and, on the other hand, fastened to the fitting lower part 9, for example suspended on a spring bolt 79, which projects from the fitting lower part 9 parallel to the switching pin 71. The switching spring 77 pretensions the operating lever 73 against the stop 17, the free end of the operating lever 73 being arranged in the immediate vicinity of the switching ring 50.

The vehicle seat 1 is able to be longitudinally adjusted by means of a longitudinal adjuster 81, i.e. in the longitudinal seat position. To this end, the longitudinal adjuster 81 comprising two seat rail pairs may be unlocked by means of a handle 83 and automatically locked after releasing the handle 83. The longitudinal adjuster 81 is, however, also unlocked when freely pivoting the backrest 2, so that the vehicle seat 1 (by means of the longitudinal adjuster 81) may be moved to the front, in order to facilitate access to the rear, in addition to the free pivoting of the backrest 2. The unlocking of the longitudinal adjuster 81 takes place, therefore, directly by means of the freely-pivoting operating element 8 or indirectly, as on the vehicle seat side without a switching ring 50 an unlocking ring 84 is provided in the fitting 5, instead of said switching ring, which is driven in a manner known per se when pivoting forward the backrest 2 and thus by means of a Bowden cable or the like controls the locking of the longitudinal adjuster 81.

A memory device of the longitudinal adjuster 81, by means of which the longitudinal seat position (memory position) set before the free pivoting may be located, is operatively connected by means of a second control cable 89, preferably a Bowden cable, with the fitting 5 which has the switching ring 50. The second control cable 89 is fastened to an arm of the operating lever 73, i.e. the memory device of the longitudinal adjuster 81 controls the operating lever 73, in order to be able to release the securing latch 64.

The free pivoting of the backrest 2 which is caused by means of the freely-pivoting operating element 8, starts with the unlocking of the fitting upper part 14 on both vehicle seat sides. The latch 24 is lifted in the manner described above radially from the second detent stop 28 of the detent plate 16. With the pivoting motion of the backrest 2 to the front, the securing latch 64 slides with its free end along the switching ring 50 and thus reaches the stop 17. An oblique contour on the securing latch 64 ensures that the securing latch 64 which is brought to bear against the stop 17 slightly pivots up with the further pivoting motion of the backrest 2 and slides along the underside of the stop 17.

After passing the stop 17, the stop contour is set back radially for the securing latch 64. By means of its pretensioning the securing latch 64 now falls behind the stop 17 (radially inside) and engages behind said stop with a securing latch contour 64, and namely outside the self-locking region. Thus it displaces the operating lever 73 which again engages behind the securing latch 64 and preferably positively secures said securing latch with a corresponding operating lever contour 73a. The pivoting motion of the backrest 2 is completed and secures the fitting upper part 14 (and thus the backrest 2).

The pivoted-forward backrest 2 is now located in the freely-pivoted position which permits unhindered access to the rear. At the same time, the vehicle seat 1 is in a forward longitudinal seat position.

In order to return to the previously adopted position of use, firstly the vehicle seat 1 is again moved to the rear, for example by pulling on the backrest 2. When the memory position is reached, the longitudinal adjuster 81 is locked and thus pulls on the second control cable 89. The second control cable 89 now pivots the operating lever 73, which releases the securing latch 64. The backrest 2 opens the securing latch 64 by the commencement of its rearward pivoting motion and may then be pivoted back unhindered. The latch 24 thus reaches the second detent stop 28 again and when reaching the previously adopted position of use again falls behind the second detent stop 28 (radially inside) so that the fitting upper part 14 and thus the fitting 5 is again locked. The operating lever 73, which is not further acted upon by the second control cable 89, is pulled back by the associated switching spring 77 again into its initial position.

If the memory position is not reached, for example due to objects in the footwell—instead of the previously described automatic opening—the securing of the backrest 2 may be manually opened by means of the freely-pivoting operating element 8. As a result, by means of the first control cable 48 the release element 32 is rotated, which pivots the catch element 34. The catch element 34 presses by means of its actuating arm 34a onto the switching finger 54 of the switching ring 50. Due to an oblique portion provided there the switching ring 50 is rotated, whereby the switching contour 52 comes to bear against the operating lever 73, and opens said operating lever. The operating lever 73, as a result, releases the securing latch 64. As described above, the backrest 2 may now be pivoted back.

Figure 11:
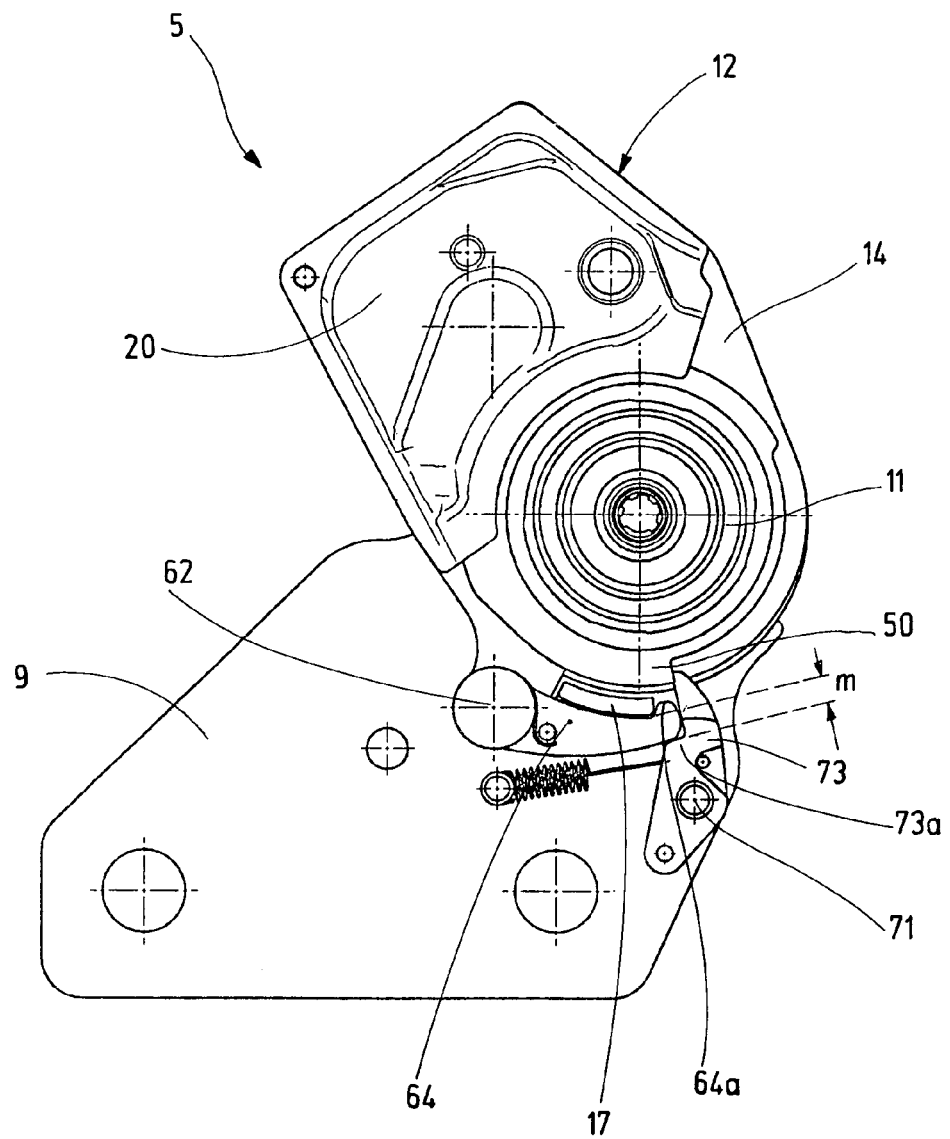
FIG. 11 is a side view of the embodiment according to FIG. 7, without the detent plate in a secured state in the freely pivoted position of the backrest, the adjustment fitting adopting an upper position in its wobble loop.
Figure 12:
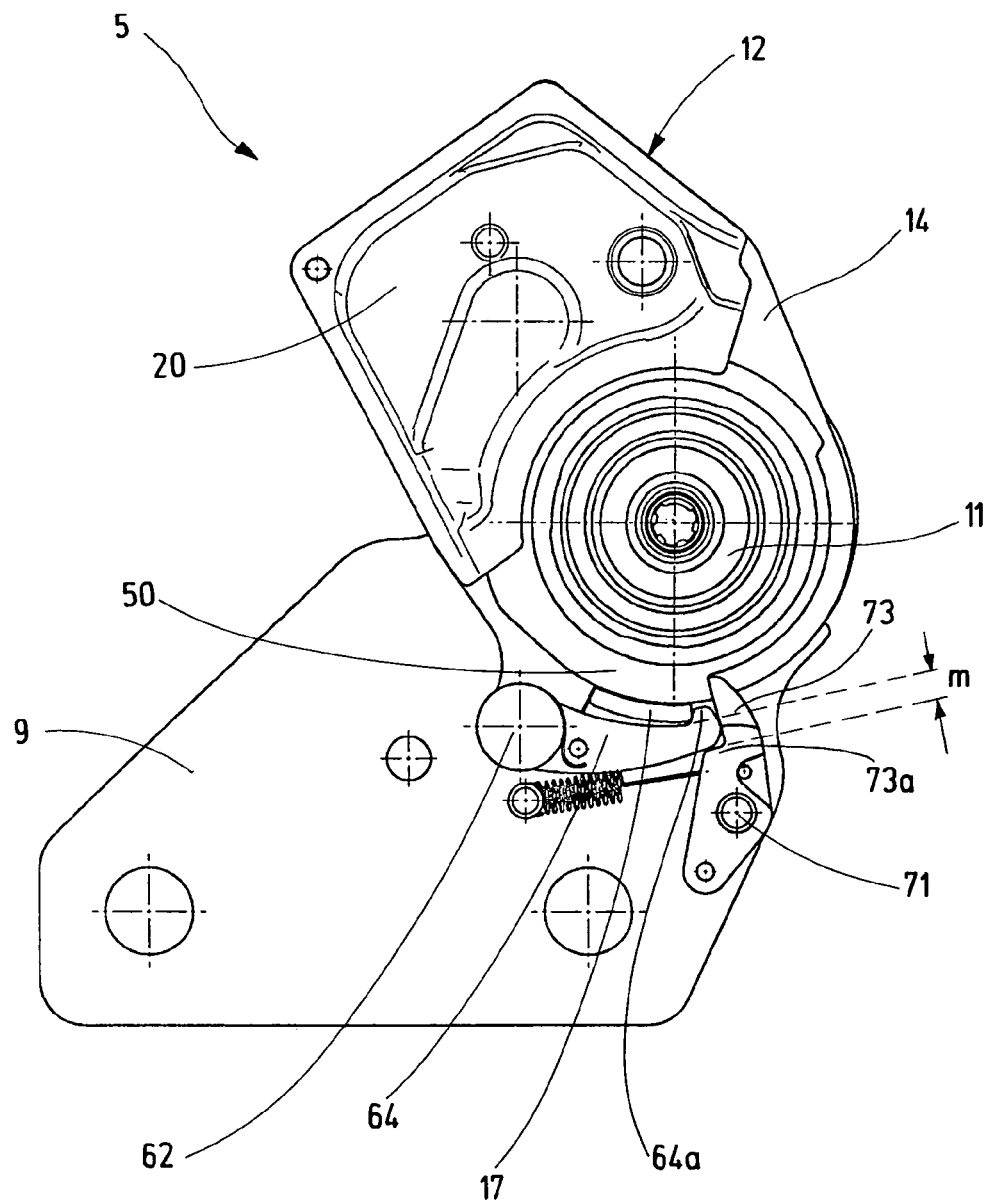
FIG. 12 is a side view of the embodiment according to FIG. 11, the adjustment fitting adopting a lower position in its wobble loop.

The securing of the fitting upper part 14 by means of the securing latch 64 in the freely-pivoted position of the backrest 2 is, in the present case, designed so that the wobble loop of the adjustment fitting 11 has no influence. As is visible from FIGS. 11 and 12, due to the wobble loop the securing pin 62 adopts different positions relative to the stop 17. However, this only has an effect on the support of the securing latch 64 on the stop 17 and on the support of the locking lever 73 on the securing latch 64 at an angle which is compensated by a suitable shape of the securing latch contour 64a and the locking lever contour 73a. Ultimately, the same degree of closing m is always produced, i.e. the spacing between the two bearing points (securing latch—stop, locking lever—securing latch) is constant.

While a specific embodiment of the invention has been described in detail to illustrate the application of the principles of the invention, it will be understood that the invention may be embodied otherwise without departing from such principles.

The invention claimed is:

1. A locking device for a vehicle seat, the locking device comprising:
   a latch and a counter element, which interact for locking;
   a bearing bush;
   a release element that is rotationally mounted inside the bearing bush;
   a catch element for reinforcing the latch in the event of a crash, said catch element being mounted in a rotationally secure manner on the release element for rotation therewith or being embodied as one piece with said release element; and
   a clamping element for securing the locked latch in a normal state of operation, the clamping element being arranged in an axial manner adjacent to said catch element, and being mounted in a pivotable manner and prestressed, the clamping element being pivotably mounted on the outside on the bearing bush.

2. The locking device as claimed in claim 1, wherein the catch element and the clamping element are coupled to one another to be carried along with free travel by means of a slotted pin guide.

3. The locking device as claimed in claim 1, wherein the locking device is a component of a fitting for a vehicle seat comprising a seat part and a backrest.

4. The locking device as claimed in claim 3, wherein the fitting comprises:
an adjustment fitting for the inclination adjustment of the backrest relative to the seat part;
a freely-pivoting unit for the centric free-pivoting of the backrest from at least one position of use into a freely pivoted position, which is triggered by means of a freely-pivoting operating element;
a fitting lower part which may be connected to the seat part, and which carries the adjustment fitting; and
a fitting upper part associated with the freely-pivoting unit, which may be connected to the backrest and which in the position of use is locked by means of the locking device.

5. The locking device as claimed in claim 4, wherein the locking device is a component of the freely-pivoting unit, the latch being pivotably articulated to the fitting upper part by means of a bearing pin, and the bearing bush being located fixedly in terms of rotation in the fitting upper part.

6. The locking device as claimed in claim 5, further comprising:
a cover connected to the fitting upper part covers the locking device.

7. The locking device as claimed in claim 5, wherein the freely-pivoting unit has a detent plate, which is connected to the adjustment fitting and which is locked as a counter element to the latch.

8. The locking device as claimed in claim 1, wherein the freely-pivoting operating element is actuated for unlocking the fitting upper part locked by means of the locking device, as a result of which by means of a first control cable and an unlocking lever located fixedly in terms of rotation on the release element, the release element is rotated about its own axis, whereupon the release element drives the catch element, which in turn drives the clamping element by means of the slotted pin guide—after passing the free travel—whereupon the latch is released.

9. The locking device as claimed in claim 1, wherein a securing latch secures the fitting upper part in the freely-pivoted position of the backrest to the fitting lower part.

10. The locking device as claimed in claim 9, wherein the securing latch securing the fitting upper part may be opened by means of a longitudinal adjuster of the vehicle seat and/or by means of the freely-pivoting operating element.

11. A vehicle seat locking device arrangement comprising a locking device comprising:
a latch;
a counter element, said latch and counter element interacting for locking the vehicle seat in a position;
a bearing bush;
a release element rotationally mounted inside said bearing bush;
a catch element for reinforcing said latch in an event of a crash of the vehicle, said catch element being mounted in a rotationally secure manner on said release element for rotation with said release element or being embodied as one piece with said release element; and
a clamping element for securing said locked latch in a normal operation state of the vehicle, said clamping element being arranged in an axial manner adjacent to said catch element and being mounted in a pivotable manner and prestressed, said clamping element being pivotably mounted on an outer surface of said bearing bush.

12. The locking device arrangement as claimed in claim 11, further comprising a slotted pin guide arrangement coupling associated with said catch element and said clamping element to couple said catch element and said clamping element.

13. The locking device arrangement as claimed in claim 11, further comprising:
a fitting for the vehicle seat, the vehicle seat comprising a seat part and a backrest, the fitting including a fitting lower part connected to the seat part and a fitting upper part connected to the backrest.

14. The locking device arrangement as claimed in claim 13, wherein the fitting comprises:
an adjustment fitting for adjusting an inclination of the backrest relative to the seat part, said adjustment fitting being carried by said fitting lower part;
a freely-pivoting unit for the centric free-pivoting of the backrest from at least one position of use into a freely pivoted position, said freely-pivoting unit being associated with said fitting upper part;
a freely-pivoting operating element for moving the freely-pivoting unit, said fitting upper part, in a position of use, being locked by said locking device.

15. The locking device arrangement as claimed in claim 14, wherein said locking device is connected to said freely-pivoting unit with said latch being pivotably articulated to said fitting upper part by means of a bearing pin, and said bearing bush being located fixedly in terms of rotation in the fitting upper part.

16. The locking device arrangement as claimed in claim 15, further comprising: a cover connected to said fitting upper part and covering said locking device.

17. The locking device arrangement as claimed in claim 15, wherein said freely-pivoting unit has a detent plate connected to said adjustment fitting, said detent plate being locked as a counter element to said latch.

18. The locking device arrangement as claimed in claim 11, wherein said freely-pivoting operating element is actuated, for unlocking said fitting upper part which is locked by said locking device, by a first control cable and an unlocking lever located fixedly in terms of rotation on said release element, said release element being rotated about a release element axis, whereby said release element drives said catch element, which in turn drives said clamping element by means of said slotted pin guide—after passing the free travel —whereupon the latch is released.

19. The locking device arrangement as claimed in claim 11, wherein a securing latch secures the fitting upper part in the freely-pivoted position of the backrest to the fitting lower part.

20. The locking device arrangement as claimed in claim 19, wherein the securing latch securing the fitting upper part is opened by means of a longitudinal adjuster of the vehicle seat and/or by means of said freely-pivoting operating element.

* * * * *